United States Patent

[11] 3,631,424

[72] Inventor William M. Regitz
Franklin, Mass.
[21] Appl. No. 843,724
[22] Filed July 22, 1969
[45] Patented Dec. 28, 1971
[73] Assignee Honeywell, Inc.
Minneapolis, Minn.

[54] BINARY DATA DETECTING APPARATUS RESPONSIVE TO THE CHANGE IN SIGN OF THE SLOPE OF A WAVEFORM
13 Claims, 6 Drawing Figs.

[52] U.S. Cl. .......... 340/174.1 H
[51] Int. Cl. .......... G11b 5/02
[50] Field of Search .......... 340/174.1 H

[56] References Cited
UNITED STATES PATENTS

| | | | |
|---|---|---|---|
| 3,207,925 | 9/1965 | Berger | 340/174.1 |
| 3,209,268 | 9/1965 | Fraunfeider | 340/174.1 |
| 3,405,403 | 10/1968 | Jacoby et al. | 340/174.1 |
| 3,417,388 | 12/1968 | Timm | 340/174.1 |
| 3,478,255 | 11/1969 | Parker et al. | 340/174.1 |
| 3,505,662 | 4/1970 | Hibner | 340/174.1 |
| 3,516,066 | 6/1970 | Jacoby | 340/174.1 |

*Primary Examiner*—Bernard Konick
*Assistant Examiner*—Vincent P. Canney
*Attorneys*—Fred Jacob and Ronald T. Reiling

ABSTRACT: In a magnetic recording system wherein a playback waveform is induced in a read transducer, detecting apparatus adapted to sense the occurrence of positive and negative voltage peaks of the playback waveform. The detecting apparatus includes first and second semiconductor active elements of opposite types, one capable of conduction during a positive-going transition of the playback waveform, while the other is capable of conduction during a negative-going transition of the playback waveform. Logic means are also included and adapted to connect to the output of the first and second semiconductor active elements.

INVENTOR
WILLIAM M. REGITZ
BY David M Driscoll
ATTORNEY

INVENTOR
WILLIAM M. REGITZ

BY David M. Driscoll
ATTORNEY

BINARY DATA DETECTING APPARATUS RESPONSIVE TO THE CHANGE IN SIGN OF THE SLOPE OF A WAVEFORM

BACKGROUND AND OBJECTS OF THE INVENTION

The present invention relates generally to binary detection apparatus for use in a magnetic record-playback system. In particular, the invention pertains to the reading of binary data by sensing the positive and negative peaks that are present in the playback waveform.

There are currently in use various techniques for representing and magnetically recording binary information. Generally speaking, there are four common techniques of recording; return to zero (RZ), nonreturn to zero (NRZ), phase modulation, and frequency modulation. In the return to zero form of binary coding, during an information interval, the appearance of a pulse of a first polarity is indicative of a first of two binary states and the appearance of a pulse of opposite polarity is indicative of a second binary state. These first and second binary states can be referred to as the ONE and ZERO states.

In one form of nonreturn to zero (NRZ) recording, the binary data is stored or represented by causing the binary information to reverse its magnetization on the record medium. For example, a reversal of magnetization or transition of the binary data, during an information interval, may be referred to as a ONE storage. Similarly, the lack of a transition during an information interval may be referred to as a ZERO storage. Various modifications of this nonreturn to zero technique are also practiced. One such technique is practiced by causing the magnetic polarization to be reversed whenever the recorded information changes from a binary ONE to a binary ZERO or vice versa.

Increased data processing speeds and the resulting desire to record at a higher bit density renders the return to zero and nonreturn to zero techniques less desirable because of timing tolerances. Because of this, other techniques have been developed such as phase modulation recording and frequency modulation recording. In a magnetic recording system wherein phase modulation techniques are employed, during each information interval the binary data experiences a transition at the approximate center of the interval. It is the direction of the transition that indicates the data content associated with that information interval. For example, a binary ONE may be represented by a change from positive to negative magnetization, and a binary ZERO by a change from negative to positive magnetization. Frequency modulation, although similar to phase modulation, is different in the manner in which the binary data content is caused to control the time at which flux reversals occur. A binary ONE, for example, may be represented by the occurrence of two flux reversals within an information interval and a binary ZERO, by the occurrence of a single flux reversal during an information interval. Usually, the single transition occurs at the commencement of the interval and the dual transitions occur at the beginning and middle of the information interval.

From the above discussion, it is noted that in both frequency and phase modulation recording, the magnetization pattern and the reproduced electrical signal have polarity reversals, the period between successive reversals being dependent upon data content. Also, both the frequency modulation and phase modulation techniques provide self-clocking of the binary information. This fact alone may enhance the usage of these techniques in lieu of the previously discussed schemes (RZ and NRZ recording).

While the phase and frequency modulation systems provide means for detecting magnetically stored information at higher densities than the RZ or NRZ systems, they still experience difficulties at very high densities. There are mechanical tolerances, for instance, that come into play. Also many times the detecting means cannot accurately detect the binary data because the detecting apparatus is adapted to interpret the amplitude of the playback signal as an indication of data content. The apparatus of the present invention, however, is adapted to sense a sufficiently significant change in flux variation or playback signal variation from either a positive-going sense to a negative-going sense or vice versa. In essence, it senses the playback waveform, from the magnetic transducer head, and detects the occurrence of a change in the sign of the slope of the playback signal.

The logic means, which comprises a part of the subject matter of the present invention, additionally prevents the detection of insignificant peaks caused by noise. In other words, in the past when the playback waveform was positive-going and then flattened (zero slope) this was erroneously detected as a positive peak. The apparatus of the present invention prevents this from happening by allowing the detection of a positive peak, for example, only when the playback signal has experienced a sufficient negative transition before it again resumes its positive-going direction.

It is an object of the present invention to provide an improved apparatus for detecting a change in the sense of the playback waveform even at relatively high recording densities.

Another object of the present invention is to provide binary detecting means that accurately sense peaks in the playback waveform.

SUMMARY OF THE INVENTION

The foregoing and other objects of the invention are attained in the apparatus described hereinafter. The binary detecting means, which respond to the change in sign of the slope of the playback waveform, includes signal input means, first and second semiconductor active elements and logic means. The input means can further include a differential amplifier with associated input filters. The first and second semiconductor active elements are of opposite type, one being capable of conduction during a positive-going transition of the playback waveform, while the other is capable of conduction during a negative-going transition of the playback waveform. The logic means includes gating means and is connected to, and adapted to sample the conduction of, the first and second semiconductor active elements thereby producing output pulses indicative of the occurrence of a change in the sign of the slope of the playback waveform.

When it is desired to translate data magnetically recorded according to phase modulation techniques, a single astable multivibrator is employed that blocks detected peaks not bearing pertinent information.

Other objects and advantages of the invention will become apparent from a consideration of the following detailed description and claims, taken together with the accompanying drawings in which:

FIG. 1 is a preferred embodiment of the detection means of the present invention.

FIGS. 2(*a*) through 2(*e*) show timing relationships with the apparatus of FIG. 1.

DETAILED DESCRIPTION

Figure 1:
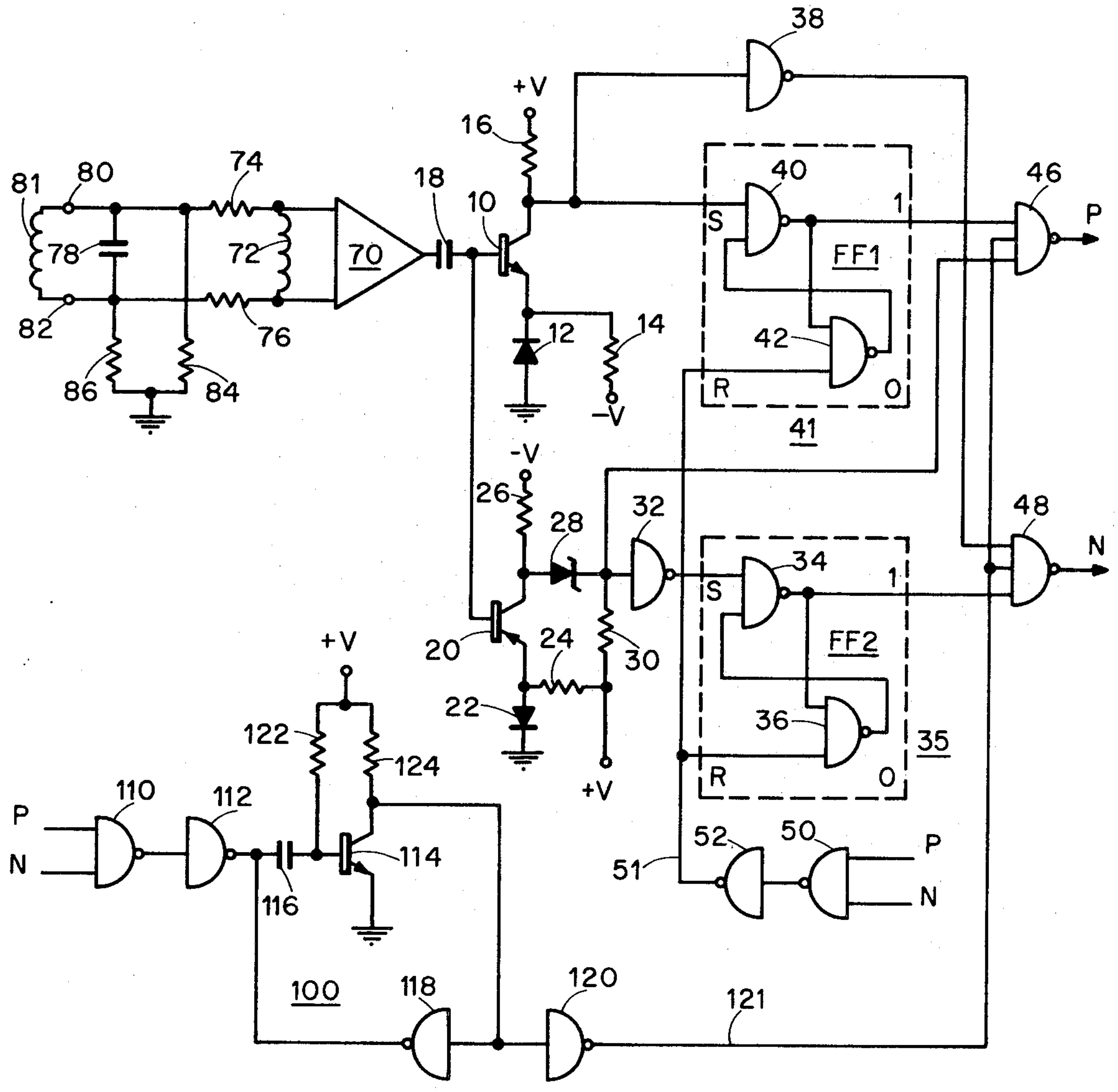
Figure 2A:
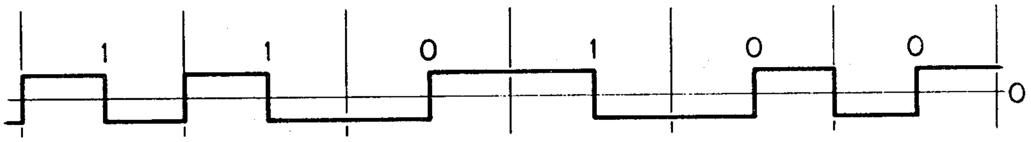
Figure 2B:
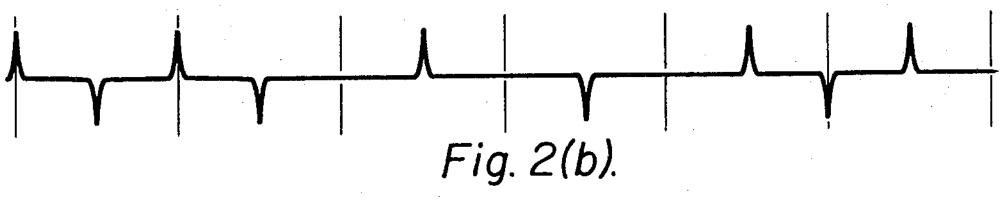
Figure 2C:
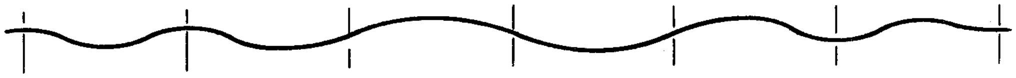
Figure 2D:
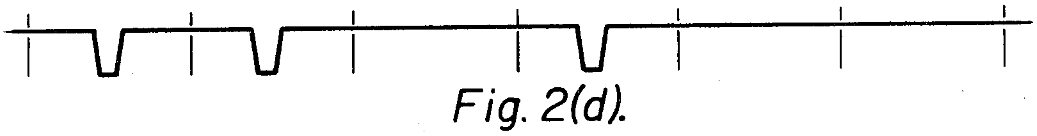
Figure 2E:
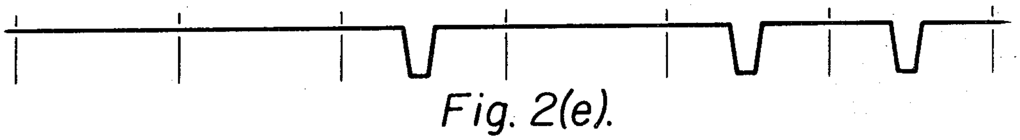

FIG. 1 shows the detection apparatus of the present invention as used in a magnetic recording system employing phase modulation techniques. Generally, in a magnetic recording system the medium to be used in storing the information passes over a transducer that is adapted to write information onto the medium and read information from the medium. As previously mentioned, the information signal read from the tape is referred to as the playback waveform.

FIG. 2(*a*) shows the current waveform which is applied to the recording head winding in order to create magnetization patterns which are representative of a train of six binary digits, 1 1 0 1 0 0. The currents flow in a positive sense when the waveform is above the zero current level and in a negative sense when the waveform is below the zero reference. FIGS. 2(*b*) and 2(*c*) show typical playback waveforms detected at different recording bit densities. These waveforms are induced in the winding of a read head as the medium passes thereover. The FIG. 2(*b*) waveform depicts a playback signal for lowdensity recording, on the order of 100 bits per inch, for example. The FIG. 2(c) waveform depicts a playback signal for a high-density recording, of over 1,000 bits per inch, for example. It is obvious from FIG. 2(c) that accurate peak detection is more difficult at higher recording densities. The circuit of the present invention is adapted to accurately detect the change in the sign of the slope of the playback signal as explained hereinafter, particularly with reference to a phase modulation system.

Referring again to FIG. 1, there is shown transducer 81, differential amplifier 70, capacitor 18, complementary semiconductor active elements represented as transistors 10 and 20 and logic means which include flip-flops 35 and 41. The signal that is induced in transducer 81 appears across terminals 80 and 82. Depending upon the direction of magnetization of the record medium, the signal at terminal 80 is either positive or negative with respect to the voltage at terminal 82. Capacitor 78 connects between terminals 80 and 82, and resistors 84 and 86 connect, respectively, from terminals 80 and 82 to ground. Similarly, resistors 74 and 76 connect, respectively, from terminals 80 and 82 to the inputs of differential amplifier 70. Inductor 72 connects across the two input terminals of the differential amplifier. Differential amplifier 70 is not shown in detail, because such devices are well known nowadays. Illustrations of differential amplifiers, are shown in the G. E. Transistor Manual, Seventh Edition at pages 111–120.

Capacitor 78 along with resistors 84 and 86 form an RC network coupled to the input of differential amplifier 70. Resistors 74 and 76, along with inductor 72 form an RL network also at the input to the differential amplifier. Both of these networks function as filter networks that eliminate noise and prevent high-frequency signal components from affecting the operation of differential amplifier 70.

The output of amplifier 70 connects, via sense capacitor 18, to the base electrodes of transistors 10 and 20. The collector electrode of transistor 10 connects, via resistor 16, to positive power source +V, to the S input of flip-flop 41 and to the input of inverter gate 38. The emitter electrode of transistor 10, connects by way of diode 12 to ground and by way of resistor 14 to negative power source −V. With reference to transistor 20, its collector electrode connects, via resistor 26, to negative power source −V, via Zener diode 28 to the input of inverter gate 32 and also via Zener diode 28 to one input of AND-type gate 46. The cathode of Zener diode 28 which connects to inverter gate 32 also connects by way of resistor 30 to positive power source +V. The emitter electrode of transistor 20 connects by way of diode 22 to ground and by way of resistor 24 to positive power source +V. The cathode of diode 22 as well as the anode of diode 12 tie to ground.

Pertaining to the operation of differential amplifier 70 and transistors 10 and 20, the following occurs. As previously mentioned, when a signal is induced in transducer 81, terminal 80 is either positive or negative with reference to terminal 82. Assuming that it is a positive signal, in the 10-millivolt range, for example, differential amplifier 70 receives this positive transition and amplifies it. The output generated from the differential amplifier is, therefore, a positive signal larger in amplitude than the signal induced in transducer 81 but of the same sense. The positive-going signal is coupled by way of capacitor 18 to the base electrodes of transistors 10 and 20. A sufficient positive voltage turns on transistor 10 and holds transistor 20 in nonconducting state. When the output signal from amplifier 70 reaches its maximum positive excursion and the signal starts going negative, terminal 80 is still positive with reference to terminal 82, the output of amplifier 70 is positive but the voltage across capacitor 18 reverses. As this transition occurs, transistor 10 goes out of conduction first and transistor 20 begins conducting as soon as the signal on the base of transistor 20 is sufficiently negative. The changeover of conduction occurs rather rapidly due in part to the slight negative emitter biasing of transistor 10 provided by diode 12, resistor 14 and negative power source −V; and the slight positive emitter biasing of transistor 20 provided by diode 22, resistor 24 and the positive power source +V. If the signal again becomes positive-going, transistor 10 conducts and transistor 20 ceases conduction.

Flip-flops 35 and 41 each have set and reset inputs labeled S and R, respectively that receive stimuli from transistors 10 and 20. Flip-flop 35 includes NAND-gates 34 and 36 connected in a cross-coupled binary arrangement. The S input to flip-flop 35 is coupled from the output of inverter gate 32 to one input of gate 34. The R inputs to flip-flops 35 and 41 are coupled from reset line 51 to gates 36 and 42 while the single output from flip-flop 35 connects to one input of AND-type gate 48. Actually, gates 46 and 48 are logic NAND gates. Another input to gate 48 connects from the output of inverter gate 38. In a similar fashion, flip-flop 41 includes two NAND-gates 40 and 42 connected in a cross-coupled binary arrangement. The S input to flip-flop 41 is coupled from the collector electrode of transistor 10 to one input of gate 40 and the single output from flip-flop 41 connects to one input of gate 46. Another input to gate 46 connects from the cathode of Zener diode 28. The output of gates 46 and 48 are, respectively, labeled P and N, thereby indicating the respective sense points of positive and negative peaks. These P and N outputs connect to gate 50 and thence via inverter gate 52 to reset line 51. Astable multivibrator 100 completes the structure shown in FIG. 1.

As previously mentioned, the positive-going portion of the playback waveform causes conduction of transistor 10 while the negative-going portion causes conduction of transistor 20. The operation of the output logic means in response to the action of transistors 10 and 20 follows. The setting and resetting of flip-flops 35 and 41 is accomplished by the application of a ground (ZERO) to the S and R inputs, respectively. If it is assumed that the operation of the circuit of FIG. 1 is observed when the playback signal is positive-going, then transistor 10 is in conduction and transistor 20 is not. It can further be assumed that the positive-going portion was preceded at some time by a negative peak and that this caused flip-flop 35 to be reset by way of reset line 51 and gates 50 and 52. The conduction of transistor 10, however, has caused the setting of flip-flop 41 (ZERO on input S). The ZERO output from the collector electrode of transistor 10 is inverted by gate 38 to a ONE and this is applied to gate 48 to enable it. With flip-flop 35 reset, however, the output of gate 48 remains a ONE, or in other words at its unselected level. Similarly, gate 46 is unselected due to the ZERO level coupled from Zener diode 28. As long as the playback waveform stays positive-going, the logic means remains unaffected.

At some point in time, however, when the playback waveform has reached its maximum positive excursion and becomes negative-going, a P output should be generated indicative of the occurrence of a positive peak. As the voltage across capacitor 18 reverses, the conduction of transistor 10 decreases and the collector of transistor 10 switches to the ONE level. This level does not affect the state of flip-flop 41 but the output of transistor 10 which is coupled via inverter gate 38 inhibits gate 48, preventing an N output.

When the signal has experienced a sufficient negative-going excursion, transistor 20 starts conducting. Previously, when transistor 20 was off, conduction occurred by way of diode 28 and resistors 26 and 30 (resistor 30 is larger in value than resistor 26). The cathode of diode 28 was at essentially ground. However, when the conduction of transistor 20 happens, its collector electrode goes positive and the voltage at the cathode of Zener diode 28 switches to the ONE level. This level is coupled by way of inverter 32, to the S input of flip-flop 35 setting the flip-flop. This action does not affect gate 48 as it was inhibited by the cessation of conduction of transistor 10. The ONE level generated from transistor 20 does enable gate 46 though and because flip-flop 41 is set, gate 46 becomes selected, or in other words its output goes to the ZERO level. The ZERO level causes a ONE at the output of gate 50 and a ZERO at the output of gate 52 which resets flip-flop 41. This action in turn inhibits gate 46 and terminates output pulse P. The output of gate 46 switches back to the ONE (unselected) level. The duration of the P output pulse is determined by the delay of gates 50, 52, 40, 42 and 46.

In the above example, if the playback waveform sloped to zero or went slightly negative-going and then went positive-going again, no detection of a positive peak would occur nor would a negative peak be detected. Flip-flop 35 would not set at that time so no N output would be generated and gate 46 would remain inhibited preventing a P output. This action provides for peak detection only when a significant slope change has occurred.

The above discussion has been set forth with respect to operation wherein a positive peak is detected. For the detection of a negative peak, the operation of the circuit of FIG. 1 is similar. A negative peak should be detected when the playback waveform experiences a change from negative-going to positive-going. Briefly, when the signal is negative-going, transistor 10 is off, transistor 20 is on and the occurrence of a P output has reset flip-flop 41. When the signal becomes positive-going, flip-flop 41 sets, gate 48 is enabled and if flip-flop 35 had been previously set by the conduction of transistor 20, an N output occurs. The N output terminates in the same manner as the previous P output.

Also included as part of the logic means of FIG. 1 is an astable multivibrator 100 adapted to connect between the outputs of gates 46 and 48 and the third inputs to gates 46 and 48. The outputs of gates 46 and 48 can be fed to utilization circuitry (not shown).

The astable multivibrator includes NAND-gates 110, 112, 118 and 120 and transistor 114. The P and N outputs, which are a ONE when not selected, connect to gate 110. The output of gate 110 is coupled by way of inverter gate 112 to one side of capacitor 116. Transistor 114 has its emitter electrode tied to ground, its collector electrode coupled via resistor 124 to power source +V and its base electrode tied to both the other side of capacitor 116 and via resistor 122 to power source +V. Inverter gate 118 connects between the collector electrode of transistor 114 and the output of gate 112. Inverter gate 120 is connected from the collector electrode of transistor 114 to the input of gates 46 and 48.

Astable multivibrator 100 is used with the remaining circuitry of FIG. 1 to provide means for interpreting the data content of the playback waveform in a phase modulation recording system. In a recording system wherein the data is recorded as shown in FIG. 2(*a*), not all transitions (peaks) contain data. When the system is synchronized, it is the peak at the middle of each interval that is to be detected. Other peaks should be ignored. The final waveforms at the outputs of gates 46 and 48 are shown, respectively, in FIGS. 2(*d*) and 2(*e*). The P and N outputs can also be used to provide self-clocking for a recording system using phase modulation recording techniques.

Previous to the occurrence of a P pulse, for instance, capacitor 116 is charged and transistor 114 is conducting. The collector electrode of transistor 114 is a ZERO, the output of inverter gate 120 a ONE and gates 46 and 48 are enabled. When the previously mentioned P pulse occurs at the middle of an information interval, this pulse is usually fed to utilization circuitry (not shown). This P pulse also activates astable multivibrator 100 and causes gates 110 and 112 to display ONE and ZERO outputs, respectively. This, in turn, causes transistor 114 to turn off because of the negative voltage on its base electrode.

Gate 118 has a ZERO output that holds one side of capacitor 116 at ground even if the input pulses (P and N) terminate. The RC time constants of resistor 122 and capacitor 116 determine the length of time that transistor 114 stays off. When the base goes sufficiently positive, transistor 114 turns on again. A pulse is generated at the output of gate 120 that goes to ground for a time in excess of one-half an information interval. This action blocks an N pulse that might have occurred at the boundary of the information interval from being erroneously interpreted as data.

Having now described the present invention with reference to certain illustrative embodiments, it should be understood that certain modifications can be made in the apparatus described which lie well within the scope of the present invention. For example, the logic gates shown in FIG. 1 which are conventionally termed NAND gates can be replaced by other logic gates such as AND, OR gates to accomplish analogous logic results. Further, the select level of the P and N pulses need not be the ZERO level, as illustrated, as occurring at the output of gates 46 and 48 respectively. It could just as likely be the ONE level. This could be readily accomplished by feeding each of the P and N pulses through an inverter gate. In addition, other modifications become obvious to those skilled in the art, all of which fall within the scope of the present invention.

Having now described the invention, what is claimed as new and novel and for which it is desired to secure Letters Patent is:

1. Detecting means for sensing the change in sign of the slope of the playback waveform, comprising:

a. input circuit means adapted to receive a playback signal and to amplify the same, said circuit means having an input terminal and an output terminal;

b. a capacitor having one side thereof coupled to the output terminal of said input circuit means, said capacitor adapted to have a voltage thereacross of a polarity consistent with the sign of the slope of the playback waveform;

c. a first semiconductor active element having input and output electrodes and a further electrode;

d. a second semiconductor active element having input and output electrodes and a further electrode, the input electrodes of said first and second semiconductor active elements being connected in common to the other side of said capacitor, the further electrodes of said first and second semiconductor active elements each being coupled to a first potential, and said first and second semiconductor active elements being opposite in type; and e. logic means including a first bistable means coupled from the output terminal of said first semiconductor active element and a second bistable means connected from the output terminal of said second semiconductor active element, said first semiconductor active element being capable of conduction when said playback waveform is progressing in a first polarity sense and said second semiconductor active element adapted to be conductive when said playback waveform is progressing in a second polarity sense.

2. Detecting means as defined in claim 1 wherein said input circuit means includes an RL filter and an RC filter connected to the input terminal of said input circuit means and a differential amplifier connected between said filters and the output terminal of said input circuit means.

3. Detecting means as defined in claim 1 wherein the further electrodes of said first and second semiconductor active elements connect, respectively, through first and second diodes to said first potential, said first diode having its anode coupled to said first potential, said first diode having its anode coupled to said first potential and said second diode having its cathode coupled to said first potential, said first and second diodes being adapted to cause rapid changeover in conduction between said first and second semiconductor active elements.

4. Detecting means as defined in claim 1 wherein said logic means further includes first and second AND gates each including first and second input terminals, said first AND gate having a connection from the output of said first bistable means and said second AND gate having a connection from the output of said second bistable means, the second input to said first AND gate being coupled from the output electrode of said second semiconductor active element and the second input to said second AND gate being coupled from the output electrode of said first semiconductor active element, the output of said first and second AND gates being a signal indicative of the presence of a positive or negative peak, respectively.

5. Detecting means as defined in claim 4 wherein said logic means further includes logic feedback means adapted to connect from the outputs of said first and second AND gates to the reset inputs of said first and second bistable means, said logic feedback means being adapted to sense an output from said first or second AND gate, resetting said first or second bistable means and thereby terminating said output of said first or second AND gates.

6. Detecting means as defined in claim 5 wherein each said bistable means includes first and second NAND gates arranged in a cross-coupled fashion, the inputs to the NAND gates forming set and reset inputs and the outputs of the NAND gates forming set and reset outputs.

7. A peak detector comprising:

a. a differential amplifier including a filter network connected to the input thereof, said differential amplifier adapted to receive an input signal and further including an output terminal;

b. a capacitor connected at one side thereof to the output of said differential amplifier and adapted to sense the voltage output of said differential amplifier;

c. a first NPN-transistor having base, emitter and collector electrodes;

d. a second PNP-transistor having base, emitter and collector electrodes, the base electrodes of said first and second transistors being connected in common to the other side of said capacitor and said emitter electrodes of said first and second transistors being coupled to ground;

e. logic means adapted to provide at a first terminal a relatively narrow output pulse upon the occurrence of a positive peak in the input signal and, at a second terminal a second relatively narrow output pulse upon the occurrence of a negative peak in the input signal, said logic means including first and second bistable flip-flops, said first flip-flop having a connection to its input from the collector electrode of said first transistor and said second flip-flop having a connection to its input from the collector electrode of said second transistor.

8. A peak detector as defined in claim 7 wherein said logic means further includes first and second AND gates, each including first and second input terminals, said first AND gate having a connection from the output of said first bistable flip-flop, and the second AND gate having a connection from the output of said second bistable flip-flop, the second input to said first AND gate being coupled from the collector electrode of said second transistor and the second input to said second AND gate being coupled from the collector electrode of said second transistor.

9. A peak detector as defined in claim 8 wherein said logic means further includes logic feedback means adapted to connect from the outputs of said first and second AND gates to the reset inputs of said first and second bistable flip-flops, said logic feedback means being adapted to detect the occurrence of a peak and to reset said first and second bistable flip-flops thereby producing an output pulse that is of short duration.

10. A peak detector as defined in claim 9 wherein each said bistable flip-flop includes first and second NAND gates arranged in cross-coupled fashion.

11. In a magnetic recording system wherein the binary data that is to be recorded is recorded using phase modulation techniques, a data detection circuit adapted to interpret the binary data content of a playback signal, said detecting circuitry comprising;

a. input circuit means including a transducer, said input circuit means being adapted to receive a playback signal and to amplify the same and further having an input terminal and an output terminal;

b. a capacitor having one side thereof connected to the output terminal of said input circuit means;

c. a first semiconductor active element having input, output and common electrodes;

d. a second semiconductor active element having input, output and common electrodes, the input electrodes of said first and second semiconductor active elements being connected in common to the other side of said capacitor, the common electrodes of said first and second semiconductor active elements each being coupled to ground, and said first and second semiconductor active elements being opposite in type;

e. logic means including a first bistable flip-flop coupled from the output terminal of said first semiconductor active element and a second bistable flip-flop connected from the output terminal of said second semiconductor active element, said first semiconductor active element being capable of conduction when said playback waveform is progressing in a first polarity sense and said second semiconductor active element adapted to be conductive when said playback waveform is progressing in a second polarity sense; and f. an astable multivibrator coupled to said first and second bistable flip-flops and adapted to respond to the change in state of either one of said bistable flip-flops.

12. A data detection circuit as defined in claim 11 wherein said logic means further includes first and second AND gates, each AND gate having first, second and third inputs and a single output, the first input to said first AND gate being connected from said first bistable flip-flop, the second input to said first AND gate being coupled from the output electrode of said second semiconductor active element, the third input to both AND gates coupled from said astable multivibrator, the first input to said second AND gate being connected from said second bistable flip-flop and the second input to said second AND gate being coupled from the output electrode of said first semiconductor active element, the input to said astable multivibrator being provided from the outputs of said AND gates, said arrangement being adapted to produce output pulses at the output of said first AND gate when pulses of a first polarity occur at approximately the middle of an information interval and to produce output pulses at the output of said second AND gate when pulses of a second polarity occur at approximately the middle of an information interval.

13. Waveform detecting circuitry comprising; a slope detecting means having an input terminal upon which is impressed a voltage waveform and first and second output terminals the signals appearing at said output terminals assuming a true level when the waveform is positive-going and negative-going, respectively; a first bistable means coupled from the first output terminal of said slope detecting means; a second bistable means connected from the second output terminal of said slope detecting means; and first and second AND gates each having first and second input terminals, said first AND gate having a connection from the first output terminals of said slope detecting means and the second AND gate having a connection from the second output terminals of said slope detecting means, the second inputs to each said first and second AND gates being coupled, respectively, from the second output terminal and the first output terminal of slope detecting means.

* * * * *